US010443998B2

United States Patent
Raho

(10) Patent No.: US 10,443,998 B2
(45) Date of Patent: Oct. 15, 2019

(54) MOVING BRIDGE COORDINATE MEASURING MACHINE

(71) Applicant: Quality Vision International, Inc., Rochester, NY (US)

(72) Inventor: Guglielmo Raho, Chieri (IT)

(73) Assignee: Quality Vision International, Inc., Rochester, NY (US)

( * ) Notice: Subject to any disclaimer, the term of this patent is extended or adjusted under 35 U.S.C. 154(b) by 72 days.

(21) Appl. No.: 15/693,598

(22) Filed: Sep. 1, 2017

(65) Prior Publication Data

US 2018/0073849 A1    Mar. 15, 2018

Related U.S. Application Data

(60) Provisional application No. 62/385,473, filed on Sep. 9, 2016.

(51) Int. Cl.
| | |
|---|---|
| *G01B 5/004* | (2006.01) |
| *G01B 21/04* | (2006.01) |
| *G01B 5/008* | (2006.01) |

(52) U.S. Cl.
CPC .......... *G01B 5/004* (2013.01); *G01B 5/008* (2013.01); *G01B 21/047* (2013.01)

(58) Field of Classification Search
CPC .... G01B 5/0002; G01B 11/005; G01B 11/24; G01B 21/047; G01B 5/004; G01B 5/008
USPC ......................................................... 33/503
See application file for complete search history.

(56) References Cited

U.S. PATENT DOCUMENTS

| | | | |
|---|---|---|---|
| 4,466,195 A | 8/1984 | Herzog | |
| 4,594,791 A * | 6/1986 | Brandstetter | G01B 5/008 33/1 M |
| 4,630,374 A * | 12/1986 | Raleigh | G01B 5/008 33/1 M |
| 4,631,834 A | 12/1986 | Hayashi et al. | |
| 4,682,418 A | 7/1987 | Tuss et al. | |
| 4,727,653 A | 3/1988 | Fujitani et al. | |
| 4,908,950 A | 3/1990 | Band et al. | |
| RE33,254 E * | 7/1990 | Brandstetter | G01B 5/008 33/1 M |
| 4,939,678 A * | 7/1990 | Beckwith, Jr. | G01B 11/005 33/1 M |
| 6,058,618 A * | 5/2000 | Hemmelgarn | G01B 1/00 33/503 |

(Continued)

OTHER PUBLICATIONS

International Search Report and Written Opinion of PCT/US17/49939 of the International Searching Authority dated Nov. 24, 2017 (9 pages).

*Primary Examiner* — Yaritza Guadalupe-McCall
(74) *Attorney, Agent, or Firm* — Andrew J. Anderson, Esq.; Harter Secrest & Emery LLP

(57) ABSTRACT

A recess or "pocket" is formed in at least one leg of a moving bridge assembly of a coordinate measuring machine, and in a particular embodiment in a primary leg of a moving bridge assembly, to permit a quill to move farther in the X direction to an end of a planar base surface of the coordinate measuring machine adjacent the leg without interfering with the leg. The recess formed in the leg of the moving bridge assembly permits coordinate measurements of a part whose width covers the full area of the planar surface of the base, without necessarily adding significant cost or increasing the footprint of the measurement system.

11 Claims, 3 Drawing Sheets

(56) References Cited

U.S. PATENT DOCUMENTS

| | | | | |
|---|---|---|---|---|
| 6,829,838 B1* | 12/2004 | Weekers | ............. | G01B 5/0014 |
| | | | | 33/503 |
| 7,591,077 B2 | 9/2009 | Pettersson | | |
| 8,825,427 B2 | 9/2014 | Kunzmann et al. | | |
| 2002/0148275 A1* | 10/2002 | Abbe | .................... | B25J 9/1692 |
| | | | | 73/1.01 |
| 2004/0182176 A1* | 9/2004 | Huang | ................ | G01B 5/0009 |
| | | | | 73/862.041 |
| 2015/0241194 A1 | 8/2015 | Nakagawa et al. | | |
| 2015/0285616 A1* | 10/2015 | Jordil | .................. | G01B 21/047 |
| | | | | 348/135 |
| 2018/0073849 A1* | 3/2018 | Raho | ..................... | G01B 5/004 |

\* cited by examiner

MOVING BRIDGE COORDINATE MEASURING MACHINE

TECHNICAL FIELD

The invention relates to moving bridge type coordinate measuring machines.

BACKGROUND OF THE INVENTION

Moving bridge coordinate measuring machines, such as illustrated in FIG. 1 (prior art), include a base 110 having a planar base surface 111, and a moving bridge assembly 120 comprising two legs 121, 122 and a cross member 123 extending in what is usually labeled as the X axis and which spans over the planar surface of the base and connects the two legs, a cross slide 130 supported by the cross member and which translates across the cross member along the X axis, and a quill 140 carried by the cross member and which is translatable towards and away from the planar base surface in what is usually labeled as the Z axis. The moving bridge assembly travels across the base in what is usually labeled as the Y axis. A system of bearings (not shown) is typically located at the base of each leg of the moving bridge assembly. At least one of the legs 121, called the primary leg, typically has relatively wide width W and/or long length L (not shown) for the cross section along the height of the leg, and a base which accommodates a plurality of bearings located near the base of the primary leg to constrain pitch and yaw as well as vertical and horizontal straightness of motion. The other leg 122 of the moving bridge assembly, called the secondary leg, typically may have a relatively narrower width and/or shorter length for its cross section along the height of the leg, and a relatively simpler bearing assembly may be typically located near the base of the secondary leg, to constrain roll.

The relatively wide and long cross sectional design of the primary leg, while beneficial for providing stability, can restrict X axis motion of the quill as the cross slide and quill are translated across the cross member toward an end of the cross member connected to the primary leg. At the primary leg end of the moving bridge assembly, a part 150 being measured thus must be shifted away from the primary leg 121 to prevent interference between the part 150 and the quill 140. To prevent interference at the secondary leg end of the moving bridge assembly, the part 150 cannot extend into the volume swept by the secondary leg 122 as the moving bridge assembly travels in the Y direction. This has the effect of reducing the useable X axis measuring range and maximum part width in the X axis direction.

U.S. Pat. No. 4,682,418 describes an extension of the Y axis "bridge guide means" in conjunction with a table extension beyond the table to allow the probe (called a quill in the present application) to access the complete planar surface. These additional elements are all with respect to the fixed base member of the structure. The table extension adds cost and significantly increases the footprint of the measurement machine.

U.S. Pat. No. 4,908,950 describes an elongated slot (labeled 12 in FIG. 1 thereof) in the "front support arm" to allow mounting styli at that end of the bridge. There is no provision, however, for the provision of clearance for the probe (or quill) itself. Additionally, this elongated slot is not in the primary leg of the bridge.

U.S. Pat. No. 4,466,195 describes a bridge type measuring machine wherein legs 4, 9 of the moving bridge assembly have a relatively long base, but constant width along the height of the legs.

It would be desirable to provide a moving bridge type coordinate measuring machine which permits measurement of a part whose width covers the full area of the planar surface of the base of the machine without necessarily adding significant cost or increasing the footprint of the measurement system.

SUMMARY OF THE INVENTION

A first embodiment of the invention is directed towards a moving bridge coordinate measuring machine comprising: a planar base; a moving bridge assembly translatable across the planar base in a first direction (Y axis) and including a first support leg, a second support leg, and a cross member spanning over the base and connecting the first leg to the second leg and extending in a second direction (X axis) perpendicular to the first direction and parallel to the plane of the planar base; a cross slide supported by the cross member and translatable across the cross member in the second direction; and a quill carried by the cross slide and translatable towards and away from the base in a third direction (Z axis) perpendicular to each of the first and second directions; wherein the first support leg has a first support leg base length ($B_l$) extending in the first direction and a first support leg base width ($B_w$) extending in the second direction, wherein the quill would interfere with the first support leg below the cross slide when the cross slide is positioned near an end of the cross member connected to the first support leg if the first support leg had a width equal to the first support leg base width (Bw) along the entire length of the first support leg at each height of the first support leg in the third direction above the first support leg base and below the cross slide, and wherein the first support leg comprises a recess formed above the first support leg base extending partially into the first support leg width and partially along the first support leg length and extending up the first support leg to accommodate the quill without interference when the cross slide is positioned near the end of the cross member connected to the first support leg.

A further embodiment of the invention is directed towards a method of measuring coordinates of an object employing a moving bridge coordinate measuring machine according to the first embodiment, comprising: placing an object onto the planar base of the moving bridge coordinate measuring machine; translating the moving bridge assembly of the moving bridge coordinate measuring machine across the planar base of the moving bridge coordinate measuring machine in a first direction (Y axis); translating the cross slide and quill of the moving bridge coordinate measuring machine across the cross member in a second direction (X axis); and translating the quill carried by the cross slide and translatable towards the base in a third direction (Z axis) perpendicular to each of the first and second directions; wherein the cross slide is translated to an end of the cross member connected to the first support leg, and the quill is accommodated without interference in the recess formed above the first support leg base extending partially into the first support leg width and partially along the first support leg length and extending up the first support leg.

The invention in one or more of its embodiments thus creates a recess or "pocket" in one leg of a moving bridge assembly, and in a particular embodiment in a primary leg of a moving bridge assembly, to permit the quill to move farther in the X direction to an end of the planar base surface adjacent the leg without interfering with the leg. The advantage to this design is that it permits measurement of a part whose width covers the full area of the planar surface of the base without adding significant cost or increasing the footprint of the measurement system.

BRIEF DESCRIPTION OF THE DRAWING FIGURES

DETAILED DESCRIPTION OF THE INVENTION

Figure 1:
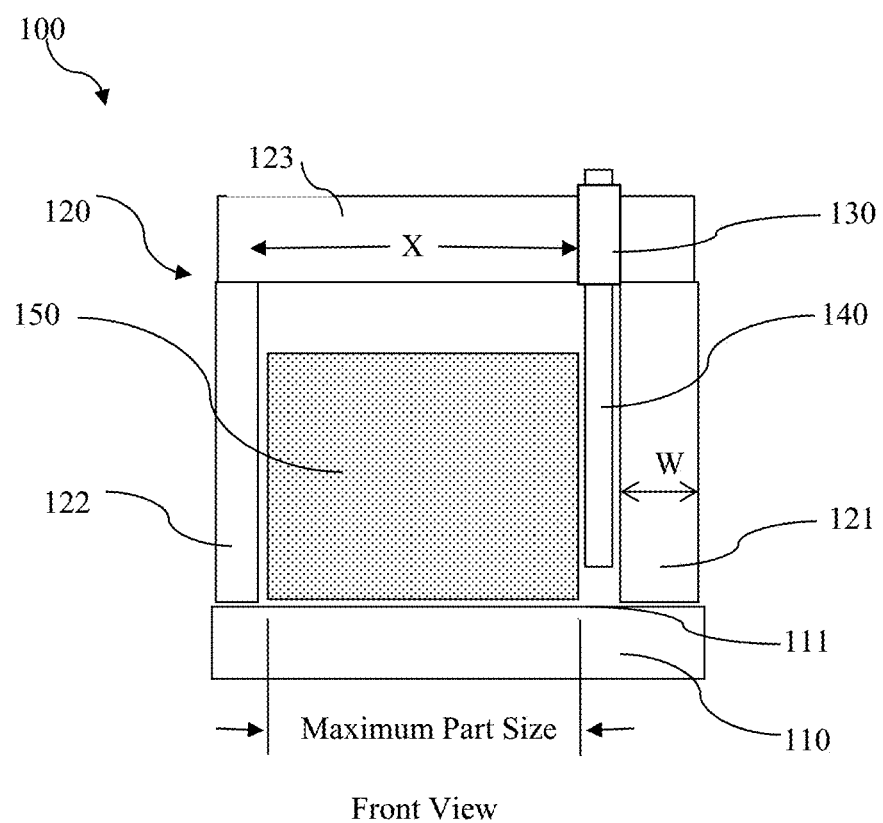
FIG. 1 is a schematic front view of a prior art moving bridge type coordinate measuring machine.
Figure 2:
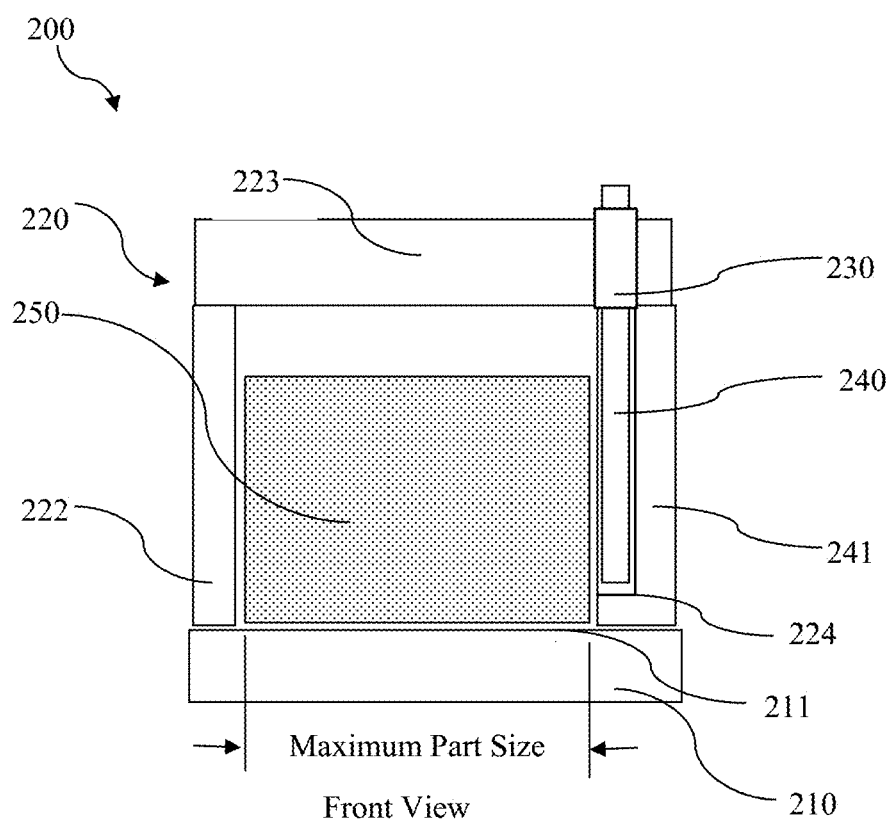
FIG. 2 is a schematic front view of a moving bridge type coordinate measuring machine in accordance with an embodiment of the present disclosure.
Figure 3:
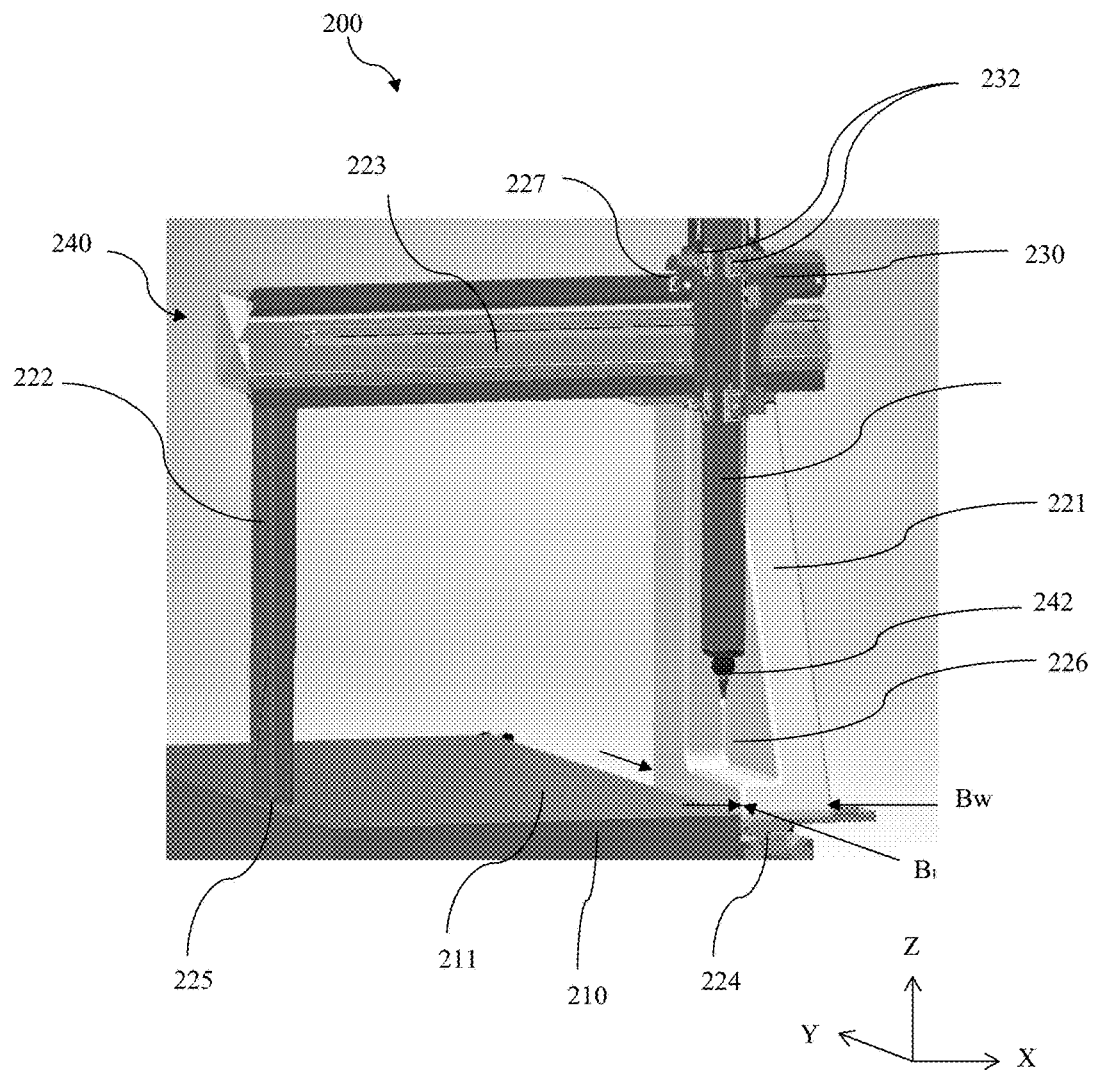
FIG. 3 is a perspective view of a moving bridge type coordinate measuring machine in accordance with an embodiment of the present disclosure.

A moving bridge type coordinate measuring machine 200 in accordance with one embodiment of the present disclosure is shown in FIGS. 2 and 3. Similarly as in prior art machine 100 in FIG. 1, moving bridge coordinate measuring machine 200 includes a base 210 having a planar base surface 211, and a moving bridge assembly 220 comprising first and second support legs 221, 222 and a cross member 223 extending in what is labeled as the X axis and which spans over the planar surface of the base and connects the two legs, a cross slide 230 supported by the cross member and which translates across the cross member along the X axis, and a quill 240 carried by the cross member and which is translatable towards and away from the planar base surface in what is labeled as the Z axis, where the moving bridge assembly travels across the base in what is labeled as the Y axis, and where a system of bearings 224, 225 are located at the base of each leg of the moving bridge assembly. First support leg 221 of machine 200, however, more specifically has a first support leg base length ($B_l$) extending in the Y axis direction and a first support leg base width ($B_w$) extending in the X axis direction, wherein the quill would interfere with the first support leg below the cross slide when the cross slide is positioned near an end of the cross member connected to the first support leg if the first support leg had a width equal to the first support leg base width (Bw) along the entire length of the first support leg at each height of the first support leg in the Z axis direction above the first support leg base and below the cross slide, and wherein the first support leg comprises a recess or "pocket" 226 formed above the first support leg base extending partially into the first support leg width and partially along the first support leg length and extending up the first support leg to accommodate the quill without interference when the cross slide is positioned near the end of the cross member connected to the first support leg as shown in FIGS. 2 and 3. As recess or pocket 226 is formed in first support leg 221 extending only partially into the first support leg width and partially along the first support leg length, first support leg 221 retains a relatively wide width and long length over at least portions of the cross section along the height of the first support leg, and thus retains a high level of leg stability to aid in constraining pitch and yaw as well as vertical and horizontal straightness of motion.

As further illustrated FIG. 3, the length of first support leg 221 in the Y axis direction may gradually decrease along the height of the first support leg in the Z axis direction. Such gradual decrease enables a relatively long base for the first support leg 221, in combination with a relatively short length in the Y axis direction for the first support leg near the cross member and cross slide, and thereby providing clearance for the cross slide in front of the first support leg, while maintaining a somewhat lengthened cross section for the first support leg in the Y axis direction over the majority of the height of the first support leg in the Z axis direction, thus enabling greater stability of the first support leg and better control of the positioning of the moving bridge assembly.

The first support leg 221 further may more particularly have a support leg base having a generally rectangular cross section having length ($B_l$) extending in the Y axis direction and width ($B_w$) extending in the X axis direction. In such specific embodiment, the recess 226 formed in the first support leg 221 may have a generally rectangular cross section parallel to the planar base surface 211 and extending partially into the first support leg base width and partially along the support leg base length from one corner of the first support leg base and extending up the first support leg. Such a rectangular cross section for the recess further advantageously provides a uniform clearance distance in the first support leg from the edge of the first support leg adjacent the planar base, accommodating a wide variety of possible quill sizes and configurations.

Second support leg 222 may have a second support leg length extending in the y axis direction at each height of the second support leg in the Z axis direction above a second support leg base and below the cross slide 223, such that the quill does not interfere with the second support leg below the cross slide when the cross slide is positioned near an end of the cross member connected to the second support leg.

While second support leg 222 of FIGS. 2 and 3 is illustrated in such embodiment as having a relatively narrower width and shorter length for its cross section along the height of the leg in comparison to first support leg 221 (similarly as for leg 122 in comparison to leg 121 of FIG. 1), second leg 222 alternatively may have a cross section with relatively wider width and longer length along its height, in combination with a recess or pocket formed therein similarly as shown for leg 221, in order to accommodate quill 240 without interference when the cross slide is positioned near the end of the cross member connected to the second support leg. Thus, the second support leg 222 may have a second support leg base length ($B_l$) extending in the Y axis direction and a second support leg base width ($B_w$) extending in the X axis direction, wherein the quill 240 would interfere with the second support leg below the cross slide when the cross slide is positioned near an end of the cross member connected to the second support leg if the second support leg had a width equal to the second support leg width (Bw) along the entire length of the second support leg at each height of the second support leg in the Z axis direction above the second support leg base and below the cross slide, and wherein the second support leg comprises a recess formed above the second support leg base extending partially into the second support leg width and partially along the second support leg base length and extending up the second support leg to accommodate the quill without interference when the cross slide is positioned near the end of the cross member connected to the second support leg.

Cross member 223 serves as a guide for cross slide 230, which is supported thereon by bearings 227 as is conventional in the art. Cross slide 230 further contains bearings 232 for guiding quill 240 in the vertical (Z axis) direction as is conventional in the art, and quill 240 as shown in FIG. 3 includes a sensor, such as in the form of a work-contact probe head 242 carried on an end of quill 240, also as is conventional in the art. Coordinate measuring machine 200 may further include conventional X, Y and Z drive motors, as well as control and calibration units. The quill, cross slide, various bearings, drive motors and control and calibration units of a bridge type coordinate measuring machine are well-known structural and electronic elements know to those skilled in the art, and thus do not require detailed explanation.

In accordance with a method embodiment of the present disclosure, a method of measuring coordinates of an object employing a moving bridge coordinate measuring machine as described herein includes: placing an object 250 onto the planar base 211 of the moving bridge coordinate measuring machine 200; translating the moving bridge assembly 220 of the moving bridge coordinate measuring machine 200 across the planar base 211 of the moving bridge coordinate measuring machine in a first direction (Y axis); translating the cross slide 230 and quill 240 of the moving bridge coordinate measuring machine across the cross member 223 in a second direction (X axis); and translating the quill 240 carried by the cross slide in a third direction (Z axis) perpendicular to each of the first and second directions; wherein the cross slide 230 is translated to an end of the cross member 223 connected to the first support leg 221, and the quill 240 is accommodated without interference in the recess 226 formed above the first support leg base extending partially into the first support leg width and partially along the first support leg length and extending up the first support leg.

While the above description references certain embodiments in detail, it will be understood that variants of these embodiments and other features and functions and alternatives thereof may be combined into many other different systems or applications. As such, various presently unforeseen or unanticipated alternatives, modifications, variations or improvements therein may be subsequently made by those skilled in the art, which are also intended to be encompassed by the following claims.

The invention claimed is:

1. A moving bridge coordinate measuring machine comprising:
   a planar base;
   a moving bridge assembly translatable across the planar base in a first direction (Y axis) and including a first support leg, a second support leg, and a cross member spanning over the base and connecting the first leg to the second leg and extending in a second direction (X axis) perpendicular to the first direction and parallel to the plane of the planar base;
   a cross slide supported by the cross member and translatable across the cross member in the second direction; and
   a quill carried by the cross slide and translatable towards and away from the base in a third direction (Z axis) perpendicular to each of the first and second directions;
   wherein the first support leg has a first support leg base length ($B_l$) extending in the first direction and a first support leg base width ($B_w$) extending in the second direction, wherein the quill would interfere with the first support leg below the cross slide when the cross slide is positioned near an end of the cross member connected to the first support leg if the first support leg had a width equal to the first support leg base width ($B_w$) along the entire length of the first support leg at each height of the first support leg in the third direction above the first support leg base and below the cross slide, and wherein the first support leg comprises a recess formed above the first support leg base extending partially into the first support leg width and partially along the first support leg length and extending up the first support leg to accommodate the quill without interference when the cross slide is positioned near the end of the cross member connected to the first support leg.

2. The moving bridge coordinate measuring machine of claim 1, wherein the first support leg length in the first direction gradually decreases along the height of the first support leg in the third direction.

3. The moving bridge coordinate measuring machine of claim 1, wherein the first support leg has a support leg base having a generally rectangular cross section having length ($B_l$) extending in the first direction and width ($B_w$) extending in the second direction.

4. The moving bridge coordinate measuring machine of claim 3, wherein the recess formed in the first support leg has a generally rectangular cross section parallel to the planar base and extending partially into the first support leg base width and partially along the support leg base length from one corner of the first support leg base and extending up the first support leg.

5. The moving bridge coordinate measuring machine of claim 1, wherein the second support leg has a second support leg length extending in the first direction at each height of the second support leg in the third direction above a second support leg base and below the cross slide, such that the quill does not interfere with the second support leg below the cross slide when the cross slide is positioned near an end of the cross member connected to the second support leg.

6. The moving bridge coordinate measuring machine of claim 1, wherein the second support leg has a second support leg base length ($B_l$) extending in the first direction and a second support leg base width ($B_w$) extending in the second direction, wherein the quill would interfere with the second support leg below the cross slide when the cross slide is positioned near an end of the cross member connected to the second support leg if the second support leg had a width equal to the second support leg width ($B_w$) along the entire length of the second support leg at each height of the second support leg in the third direction above the second support leg base and below the cross slide, and wherein the second support leg comprises a recess formed above the second support leg base extending partially into the second support leg width and partially along the second support leg base length and extending up the second support leg to accommodate the quill without interference when the cross slide is positioned near the end of the cross member connected to the second support leg.

7. A method of measuring coordinates of an object employing a moving bridge coordinate measuring machine of claim 1, comprising:
   placing an object onto the planar base of the moving bridge coordinate measuring machine;
   translating the moving bridge assembly of the moving bridge coordinate measuring machine across the planar base of the moving bridge coordinate measuring machine in a first direction (Y axis);
   translating the cross slide and quill of the moving bridge coordinate measuring machine across the cross member in a second direction (X axis); and
   translating the quill carried by the cross slide and translatable towards the base in a third direction (Z axis) perpendicular to each of the first and second directions;

wherein the cross slide is translated to an end of the cross member connected to the first support leg, and the quill is accommodated without interference in the recess formed above the first support leg base extending partially into the first support leg width and partially along the first support leg length and extending up the first support leg.

8. The method claim 7, wherein the first support leg of the moving bridge coordinate measuring machine has a support leg base having a generally rectangular cross section having length ($B_l$) extending in the first direction and width ($B_w$) extending in the second direction.

9. The method claim 8, wherein the recess formed in the first support leg of the moving bridge coordinate measuring machine has a generally rectangular cross section parallel to the planar base and extending partially into the first support leg base width and partially along the support leg base length from one corner of the first support leg base and extending up the first support leg.

10. The method claim 7, wherein the second support leg of the moving bridge coordinate measuring machine has a second support leg length extending in the first direction at each height of the second support leg in the third direction above a second support leg base and below the cross slide, such that the quill does not interfere with the second support leg below the cross slide when the cross slide is positioned near an end of the cross member connected to the second support leg.

11. The method claim 7, wherein the second support leg of the moving bridge coordinate measuring machine has a second support leg base length ($B_l$) extending in the first direction and a second support leg base width ($B_w$) extending in the second direction, wherein the quill would interfere with the second support leg below the cross slide when the cross slide is positioned near an end of the cross member connected to the second support leg if the second support leg had a width equal to the second support leg width ($B_w$) along the entire length of the second support leg at each height of the second support leg in the third direction above the second support leg base and below the cross slide, and wherein the second support leg comprises a recess formed above the second support leg base extending partially into the second support leg width and partially along the second support leg base length and extending up the second support leg to accommodate the quill without interference when the cross slide is positioned near the end of the cross member connected to the second support leg.

* * * * *